US009473596B2

(12) United States Patent
Fox et al.

(10) Patent No.: US 9,473,596 B2
(45) Date of Patent: Oct. 18, 2016

(54) USING TRANSMISSION CONTROL PROTOCOL/INTERNET PROTOCOL (TCP/IP) TO SETUP HIGH SPEED OUT OF BAND DATA COMMUNICATION CONNECTIONS

(75) Inventors: Michael J. Fox, New Hill, NC (US); Constantinos Kassimis, Cary, NC (US); Donald W. Schmidt, Stone Ridge, NY (US); Jerry W. Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 13/246,028

(22) Filed: Sep. 27, 2011

(65) Prior Publication Data

US 2013/0080561 A1 Mar. 28, 2013

(51) Int. Cl.
| | | |
|---|---|---|
| *G06F 15/167* | (2006.01) | |
| *G06F 15/16* | (2006.01) | |
| *H04L 29/06* | (2006.01) | |
| *H04L 29/08* | (2006.01) | |

(52) U.S. Cl.
CPC ............... *H04L 69/08* (2013.01); *H04L 29/06* (2013.01); *H04L 29/08576* (2013.01)

(58) Field of Classification Search
CPC .. H04L 69/08; H04L 29/06; H04L 29/08576
USPC ........................................................ 709/212
See application file for complete search history.

(56) References Cited

U.S. PATENT DOCUMENTS

| | | | |
|---|---|---|---|
| 5,701,413 A | 12/1997 | Zulian et al. | |
| 6,347,337 B1 | 2/2002 | Shah et al. | |
| 6,721,806 B2 | 4/2004 | Boyd et al. | |
| 7,114,096 B2 | 9/2006 | Freimuth et al. | |
| 7,376,755 B2 * | 5/2008 | Pandya | ......................... 709/250 |
| 7,551,614 B2 | 6/2009 | Teisberg et al. | |
| 7,580,415 B2 | 8/2009 | Hudson et al. | |
| 7,664,833 B2 * | 2/2010 | Shoolman | ........... H04L 67/1027 709/219 |
| 7,971,236 B1 | 6/2011 | Lentini | |
| 8,473,692 B2 | 6/2013 | Rosales et al. | |
| 8,627,136 B2 | 1/2014 | Shankar et al. | |
| 8,631,133 B1 * | 1/2014 | Jonnala | ................... H04L 69/14 709/227 |
| 8,880,935 B2 | 11/2014 | Fox et al. | |
| 8,930,507 B2 | 1/2015 | Schmidt et al. | |

(Continued)

FOREIGN PATENT DOCUMENTS

WO  WO0036509 A2  6/2000

OTHER PUBLICATIONS

Non-final office action dated Sep. 13, 2013 regarding U.S. Appl. No. 13/423,188, 20 pages.
Final Office Action dated Jan. 17, 2014, regarding U.S. Appl. No. 13/423,188, 17 pages.
Office Action, dated Dec. 31, 2014, regarding U.S. Appl. No. 13/423,188, 19 pages.

(Continued)

*Primary Examiner* — Kevin Bates
*Assistant Examiner* — Nazia Naoreen
(74) *Attorney, Agent, or Firm* — Yee & Associates, P.C.; Parashos Kalaitzis

(57) ABSTRACT

A transport layer connection is established between a first system and a second system. The establishment of the transport layer connection includes identifying a remote direct memory access (RDMA) connection between the first system and the second system. After establishing to transport layer connection, the first and second systems exchange data using the RDMA connection identified in establishing the transport layer connection.

12 Claims, 8 Drawing Sheets

(56) References Cited

U.S. PATENT DOCUMENTS

| | | |
|---|---|---|
| 8,954,785 B2 | 2/2015 | Fox et al. |
| 9,178,966 B2 | 11/2015 | Fox et al. |
| 2003/0037178 A1 | 2/2003 | Vessey et al. |
| 2003/0061417 A1 | 3/2003 | Craddock et al. |
| 2003/0169775 A1 | 9/2003 | Fan et al. |
| 2004/0022262 A1 | 2/2004 | Vinnakota et al. |
| 2004/0049774 A1 | 3/2004 | Boyd et al. |
| 2004/0083481 A1 | 4/2004 | Shultz et al. |
| 2006/0129676 A1 | 6/2006 | Modi et al. |
| 2006/0168274 A1 | 7/2006 | Aloni et al. |
| 2006/0265521 A1 | 11/2006 | Boyd et al. |
| 2007/0028138 A1 | 2/2007 | Noya et al. |
| 2007/0060366 A1 | 3/2007 | Morrow et al. |
| 2008/0034418 A1 | 2/2008 | Venkatraman et al. |
| 2008/0140877 A1 | 6/2008 | Baba et al. |
| 2009/0271796 A1 | 10/2009 | Kojima |
| 2010/0217916 A1 | 8/2010 | Gao et al. |
| 2011/0314194 A1 | 12/2011 | Sharp et al. |
| 2012/0079143 A1 | 3/2012 | Krishnamurthi et al. |
| 2012/0198188 A1 | 8/2012 | Coronado et al. |
| 2013/0007180 A1* | 1/2013 | Talpey .................. H04L 47/722 709/212 |
| 2013/0031341 A1 | 1/2013 | Ganti et al. |
| 2013/0080562 A1 | 3/2013 | Fox et al. |
| 2013/0332557 A1 | 12/2013 | Fox et al. |
| 2013/0332677 A1 | 12/2013 | Fitzpatrick et al. |
| 2013/0332678 A1 | 12/2013 | Fitzpatrick et al. |
| 2013/0332696 A1 | 12/2013 | Schmidt et al. |
| 2013/0332767 A1 | 12/2013 | Fox et al. |

OTHER PUBLICATIONS

Notice of Allowance, dated Jun. 24, 2015, regarding U.S. Appl. No. 13/423,188, 11 pages.

Office Action, dated Mar. 27, 2014, regarding U.S. Appl. No. 13/494,831, 14 pages.

Notice of Allowance, dated Jun. 16, 2014, regarding U.S. Appl. No. 13/494,831, 5 pages.

Office Action, dated Jun. 13, 2014, regarding U.S. Appl. No. 13/791,097, 20 pages.

Notice of Allowance, dated Sep. 30, 2014, regarding U.S. Appl. No. 13/791,097, 13 pages.

Office Action, dated Aug. 12, 2014, regarding U.S. Appl. No. 13/484,800, 16 pages.

Notice of Allowance, dated Aug. 29, 2014, regarding U.S. Appl. No. 13/494,800, 8 pages.

Office Action, dated Jun. 15, 2015, regarding U.S. Appl. No. 13/494,837, 34 pages.

Final Office Action, dated Nov. 4, 2015, regarding U.S. Appl. No. 13/494,837, 16 pages.

Notice of Allowance, dated Apr. 13, 2016, regarding U.S. Appl. No. 13/494,837, 19 pages.

Office Action, dated Jun. 26, 2015, regarding U.S. Appl. No. 13/790,039, 29 pages.

Final Office Action, dated Nov. 5, 2015, regarding U.S. Appl. No. 13/790,039, 23 pages.

Notice of Allowance, dated May 3, 2016, regarding U.S. Appl. No. 13/790,039, 18 pages.

* cited by examiner

USING TRANSMISSION CONTROL PROTOCOL/INTERNET PROTOCOL (TCP/IP) TO SETUP HIGH SPEED OUT OF BAND DATA COMMUNICATION CONNECTIONS

BACKGROUND

The present invention relates generally to the field of data communication and networking, and more particularly to systems and computer program products that use Transmission Control Protocol/Internet Protocol (TCP/IP) to setup high speed out of band data communication connections.

InfiniBand™ and Remote Direct Memory Access (RDMA) are existing, known, technologies for high speed connectivity between hosts and servers. These technologies are implemented in a networking environment with additional hardware and corresponding software, including drivers and application programming interfaces. This means that using these high-speed technologies requires server programs, applications, and clients to code to specific APIs to exploit them. For example, instead of sockets, User Direct Access Programming Library (UDAPL) would be used to communicate using InfiniBand™.

There is a large existing base of servers, applications, and clients that are coded to the TCP/IP sockets interface for communication. For these programs to exploit high speed interconnects in the current art, significant rewriting of their communications methods would be required. This is a major undertaking and may not even be practical in some cases (for example legacy applications whose source code or coding skill is lost).

The current state of the art for this problem is Sockets Direct Protocol (SDP), which bypasses TCP/IP and provides an alternative protocol stack "underneath" the sockets layer. This allows applications which are coded to the widely adopted Sockets standard to run unmodified, and the SDP stack under the sockets layer handles all the communication. However there also exists a large legacy installed base of firewalls, load balancers, and other technologies that businesses rely on to manage and secure their networks. These technologies rely on the ability to manage TCP/IP setup flows to perform their function. Because SDP dispenses with these flows, these network elements would have to be reinvented for SDP. Additionally, many TCP/IP stacks are mature products with built-in security, quality of service, tracing, auditing, etc. capabilities that would have to be reinvented for SDP.

Because of these limitations, SDP is generally seen as suitable for tightly coupled high performance networking, not for multi-tier business environments with complicated security and quality of service requirements.

BRIEF SUMMARY

Embodiments of the present invention provide to systems and computer program products for providing high-speed, direct memory access communication between legacy systems transparently to those legacy systems. A system according to an embodiment of the present invention establishes a transport layer connection between a first system and a second system. The establishment of the transport layer connection includes identifying a remote direct memory access (RDMA) connection between the first system and the second system. After establishing a transport layer connection, the first and second systems exchange data using the RDMA connection identified in establishing the transport layer connection. The transport layer connection stays active, though idle, while the out of band communication over the RDMA connection proceeds.

In some embodiments, the first and second systems exchange RDMA connection identification parameters during a transport layer setup process between the first system and the second system. For example, the first system may send a Transport Control Protocol/Internet Protocol (TCP/IP) SYN message to the second system. The SYN message includes options identifying an RDMA over converged Ethernet (RoCE) address for the first system. In response to receiving the SYN message, the second system may send a TCP/IP SYN-ACK message to the first system. The SYN-ACK message includes options identifying a RoCE address, a queue pair (QP) number, a remote memory buffer (RMB) key, and RMB indexing information for the second system. In response to receiving the SYN-ACK message, the first system may send a TCP/IP ACK message to the second system. The ACK message includes options identifying a QP number, an RMB key, and RMB indexing information for the first system.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
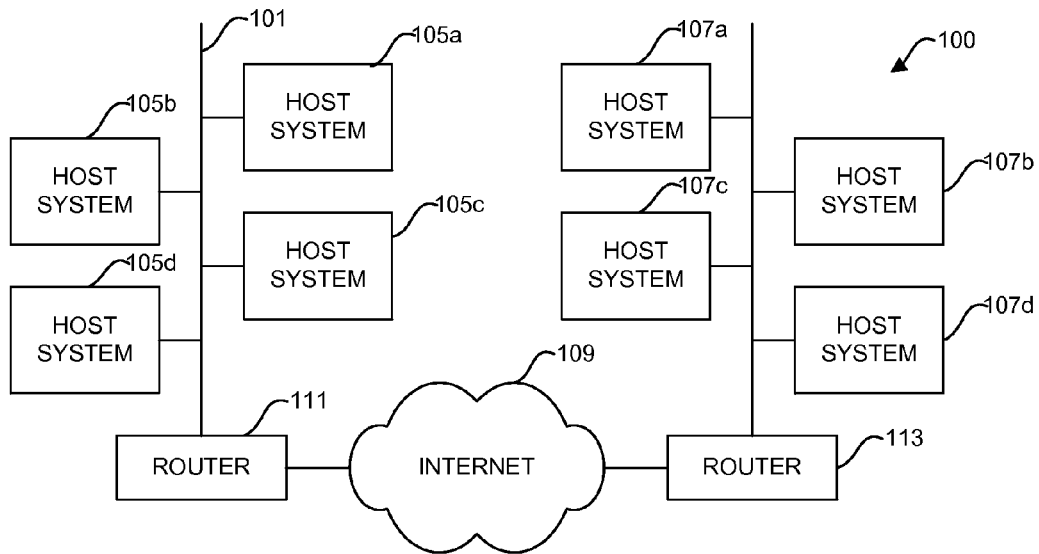
FIG. 1 is a block diagram of an embodiment of a system according to the present invention.

Referring now to the drawings, and first to FIG. 1, a system is designated generally by the numeral 100. System 100 includes a first local area network (LAN) 101 and a second LAN 103. In the embodiment of FIG. 1, LANs 101 and 103 are Ethernet networks. LAN 101 includes several host systems 105. Similarly, LAN 103 includes several host systems 107. Host systems 105 and 107 may comprise any suitable computing devices, such as personal computers. LANs 101 and 103 are connected to the Internet 109 by means of routers 111 and 113, respectively.

Figure 2:
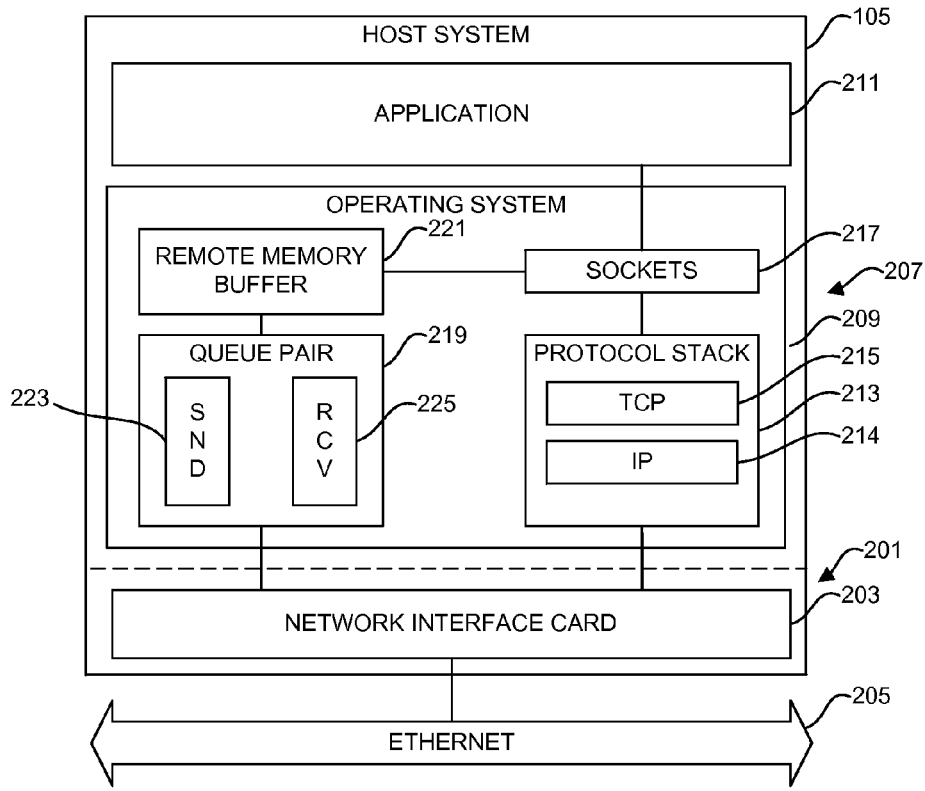
FIG. 2 is a block diagram of an embodiment of a host system according to the present invention.

FIG. 2 illustrates an embodiment of a host system 105 according to the present invention, which may be implemented in computer system such as the one illustrated in, for example, FIG. 9. Host system 105 includes hardware components, indicated generally at 201, including a network interface card 203, also known as a network adapter. Network interface card 203 provides connectivity to an Ethernet fabric 205. Hardware resources 201 include other physical resources, such as processors, memory, and the like.

Host system 105 also includes software components, indicated generally at 207, including an operating system 209 and at least one application 211. Operating system 209 includes various programs, such as device drivers, data, and data structures that manage hardware resources, such as network interface card 203, and provide common services for various application programs, such as application 211. Application 211 may be any program, such as a web browser, email client, or the like.

Embodiments of the present invention enable end-to-end connections across LAN 101, LAN 103, and/or Internet 109 between application 211 processes running on host systems 105 and/or 107. According to the present invention, application 211 may communicate with applications running on other host systems using either TCP/IP connections or remote direct memory access (RDMA) connections. To enable TCP/IP connections, operating system 209 includes a protocol stack 213, which includes among other components, an IP layer 214 and a TCP layer 215. Protocol stack 213 includes executable code and data structures associated with the kernel of operating system 209. The code resides in memory locations associated with the kernel. The data structures are portions of memory that are used by protocol stack 213 code to retain static and dynamic variables.

IP layer 214 receives IP packets from lower level protocol layers of protocol stack 213 and sends TCP segments to TCP layer 215. TCP layer 215 sends data packets to appropriate sockets 217. Operating system 209 and application 211 create a socket. Generally, a socket is a data structure in the kernel that provides an input and output channel for a process or thread of application 211. Operating system 209 maps a socket to a particular application process or thread. The kernel of operating system is involved in processing data packets through each layer of protocol stack 213. Each socket 217 is identified by tuple including a source IP address, a source port number, a destination IP address and a destination port number.

RDMA connections allow application 211 to write data directly to, and read data directly from, memory associated with applications running on other hosts systems 105 and/or 107, without involvement of the TCP/IP stack of operating system 209 in the transfer of data. To enable such direct transfers, operating system includes a queue pair (QP) 219 and a remote memory buffer (RMB) allocated to each RDMA connection. Each QP 219 includes a send queue 223 and receive queue 225. An RDMA connection is identified by a source QP number, a source RMB index, a destination QP number, and a destination RMB index.

As will be described in detail hereinafter, embodiments of the present invention identify an RDMA connection during the setup of TCP/IP connection between host 105 and a remote host 105 or 106, and then perform the actual data communication between host 105 and the remote host using the RDMA connection identified during the TCP/IP connection setup. Embodiments of the present invention provide a new option type in the IP header format.

Figure 3:
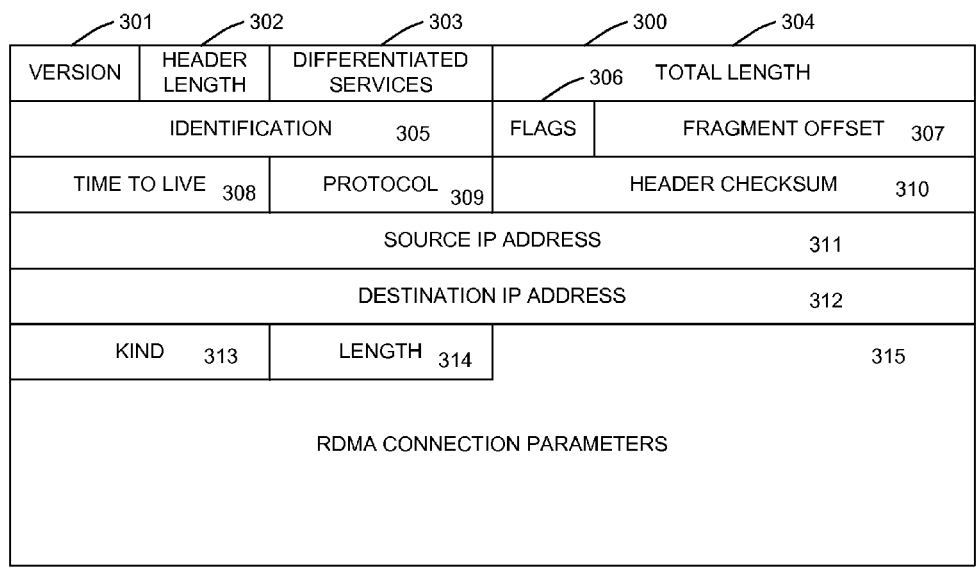
FIG. 3 is a pictorial view of an embodiment of a Internet Protocol version 4 (IPv4) header according to the present invention.

Referring to FIG. 3, an Internet Protocol version 4 (IPv4) header 300 according to an embodiment of the present invention is illustrated. IP header 300 has twelve mandatory fields and optional options extensions. The twelve mandatory fields are version 301, header length 302, differentiated services 303, total length 304, identification 305, flags 306, fragment offset 307, time to live 308, protocol 309, header checksum 310, source IP address 311, and destination IP address 312.

Header length 302 is a 4-bit field that specifies the number of 32-bit words in header 300. The minimum header length is five, and the maximum header length is fifteen. Thus, ten 32-bit words are available for options extensions. Protocol 309 is an 8-bit field that specifies the protocol used in the data portion of the IP datagram, which according to embodiments of the present invention is TCP.

According to embodiments of the present invention, the options extensions include RDMA connection information. An 8-bit kind field 313 identifies the option kind as RDMA. IP currently specifies several kind codes. Any unassigned kind code may be used to specify RDMA. An 8-bit length field 314 specifies the length of the RDMA connection information. An RDMA connection parameters field 315 contains the parameters that identify the RDMA connection. The parameters and the length of the RDMA options extensions depend on the context of the IP header. RDMA connection parameters field may include padding to fill unused space in the options portion of the header. It should be recognized that RDMA options may be implemented using Internet Protocol version 6 (IPv6) extension headers, which follow the IPv6 header. Alternatively, RDMA options may be included in a TCP header rather than in an IP header.

Figure 4:
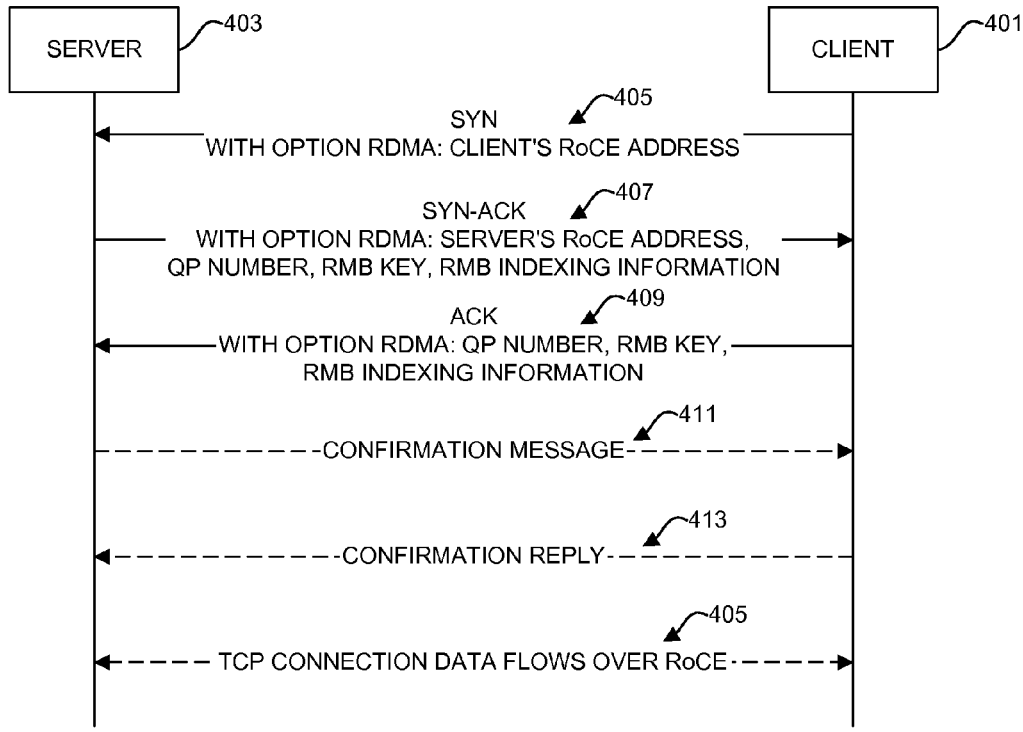
FIG. 4 is a message flow diagram of an embodiment of the present invention.

FIG. 4 is a message flow diagram of an embodiment of TCP/IP and RDMA connection setup between a client 401 and server 403 according to the present invention. Client 401 and server 403 first perform a three-way handshake to establish a TCP/IP socket connection. Client 401 sends to server 403 a TCP/IP SYN message 405 with the RDMA option including the RDMA over Converged Ethernet (RoCE) address of client 401. A RoCE address uniquely identifies network interface card 203 of FIG. 1 and it may comprise the combination of a media access control (MAC) address and a global ID (GID). In response to receiving SYN message 405, server 403 sends to client 401 a TCP/IP SYN-ACK message 407 with the RDMA option including the RoCE address, QP number, RMB key, and RMB indexing information, which includes an RMB index, an RMB length, and an RMB element alert token, of server 403. The RMB key provides security for direct memory access during the RDMA connection. The RMB index identifies the location of the remote memory buffer for this TCP/IP connection. The RMB element alert token is used during RDMA writes to the RMB buffer to help the RDMA software find the RMB and element as data comes in. In response to receiving SYN-ACK message 407, client 401 sends to server 403 a TCP/IP ACK message 409 with the RDMA option including the QP number, RMB key, and RMB indexing information of client 401, thereby completing the TCP/IP three-way hand shake, establishing a TCP/IP connection between client 401 and server 403, and identifying a RoCE connection between client 401 and server 403.

After having completed the TCP/IP three-way hand shake, server 403 sends to client 401, using the RoCE connection, an RDMA confirmation message 411. In response to receiving confirmation message 411, client 401 sends to server 403, again using the RoCE connection, an RDMA reply 413. Then, client 401 and server 403 begin data flows over the RoCE connection, as indicated at 415.

According to embodiments of the present invention, after the RoCE connection is established, all data flows occur over RoCE. As will be described in detail hereinafter, when both client 401 and server 403 finish sending data over the RoCE connection, they terminate the TCP/IP connection. However, client 401 and server 403 wait a predetermined amount of time before terminating the RoCE connection.

Figure 5:
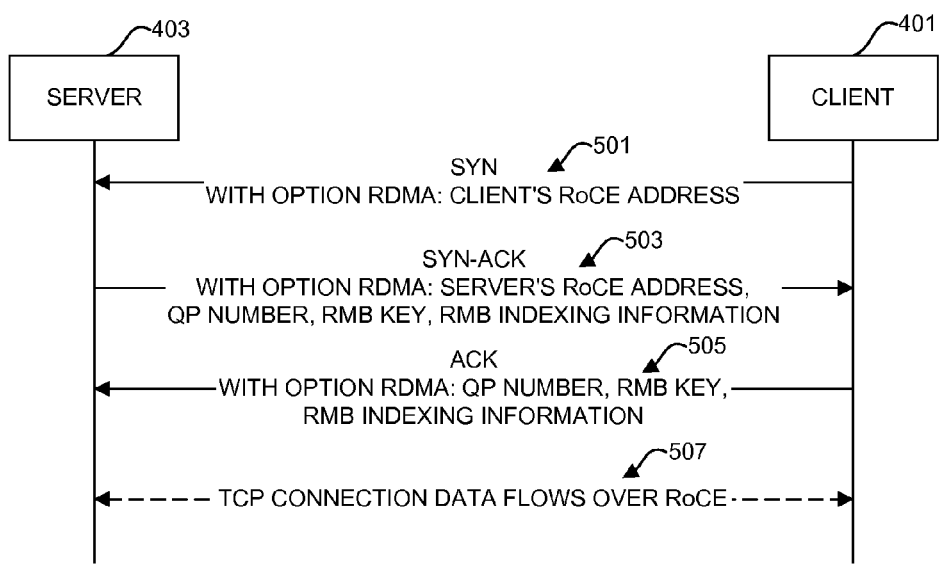
FIG. 5 is a message flow diagram of a second embodiment of the present invention.

FIG. 5 is a message flow diagram illustrating an embodiment of establishment of another TCP/IP connection over an existing RoCE connection according to the present invention. As will be described in detail hereinafter, a RoCE connection may be left open for a selected time after the TCP/IP connection has been closed so that more data flows can be accomplished over the RoCE connection with less setup overhead. Additionally, separate TCP/IP connection data flows may be multiplexed on the same RoCE connection. Client 401 sends to server 403 a TCP/IP SYN message 501 with the RDMA option including the RoCE address of client 401. Then, server 403 sends to client 401 a TCP/IP SYN-ACK message 503 with the RDMA option including the RoCE address, QP number, RMB key, and RMB indexing information of server 403. Then, client 401 sends to server 403 a TCP/IP ACK message 505 with the RDMA option including the RoCE address, QP number, RMB key, and RMB indexing information of client 401. The RMB indexes identify the sections set aside by server 403 and client 401 in their respective RMBs for this specific TCP/IP connection. If client 401 and server 403 recognize that they have an existing RoCE connection with the same parameters contained in the TCP/IP three-way handshake, client 401 and server 403 proceed directly to flow data over the RoCE connection, as indicated at 507.

Figure 6A:
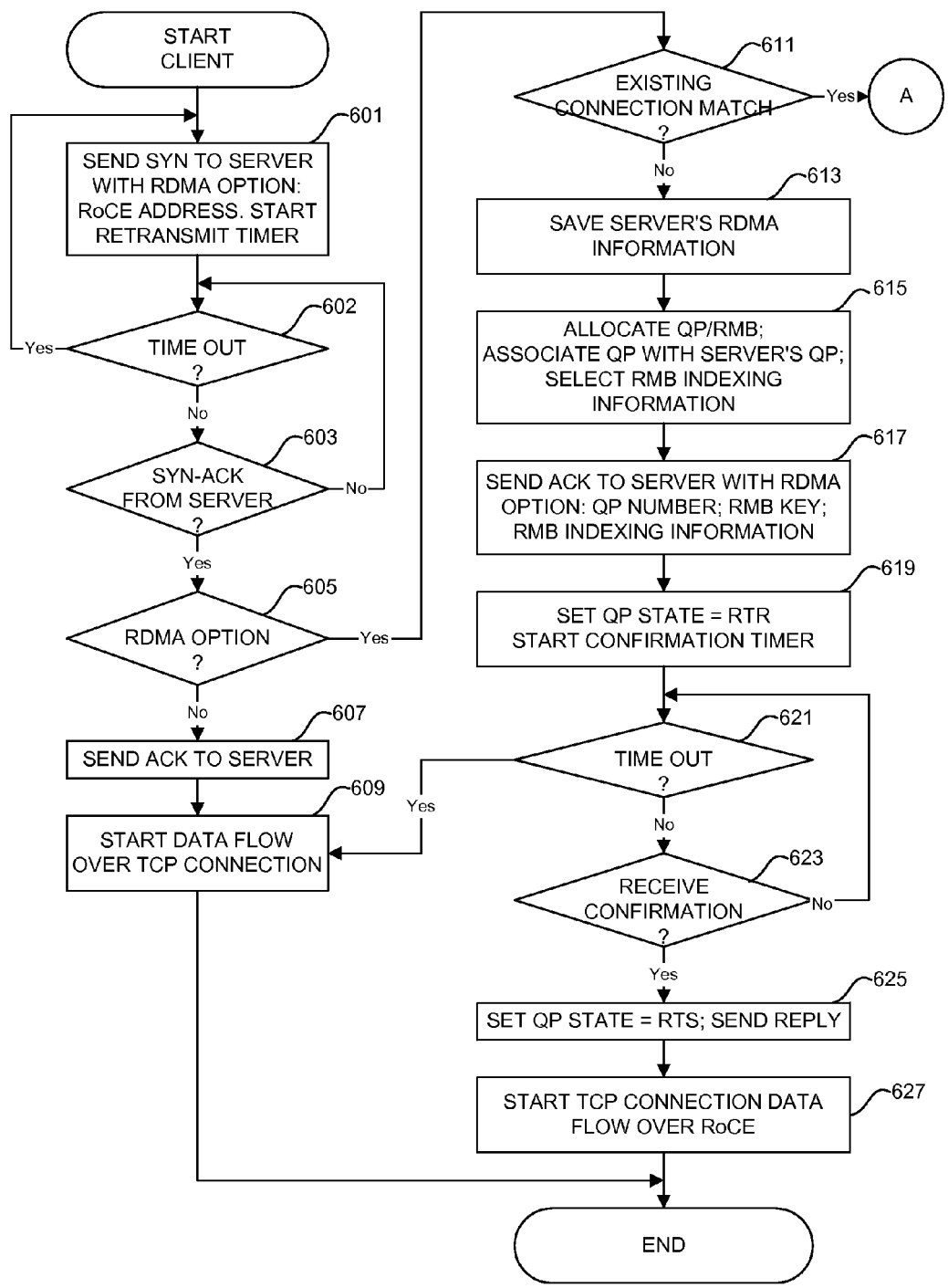
FIGS. 6A and 6B comprise a flowchart of an embodiment of client connection setup processing according to the present invention.
Figure 6B:
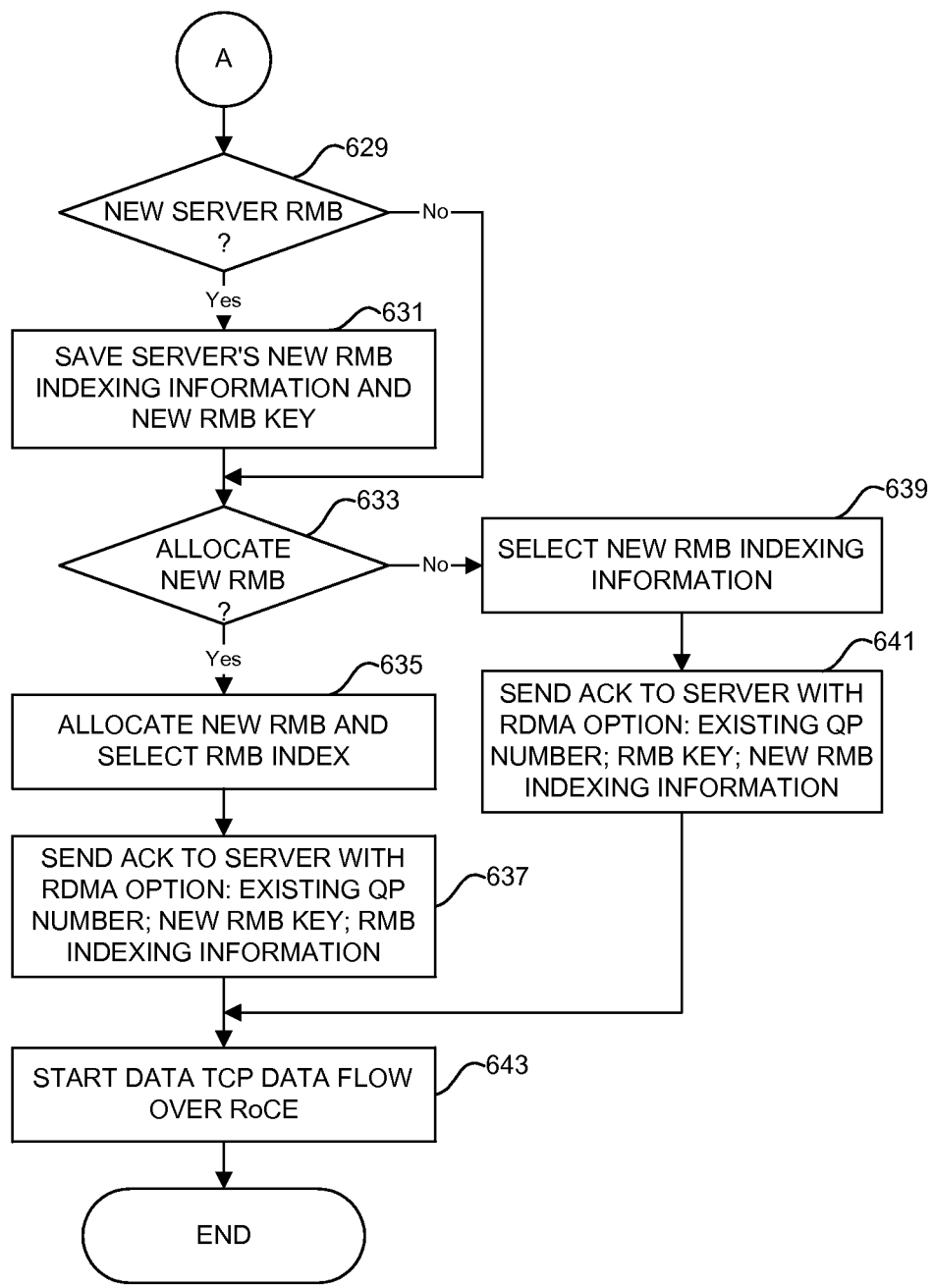

FIGS. 6A and 6B comprise a flowchart of an embodiment of client TCP/IP and RDMA connection setup. The client sends a TCP/IP SYN message to the server with the RDMA option, including the client's RoCE address, and starts a retransmit timer, at block 601. The client then waits for a TCP/IP SYN-ACK message from the server. If, as determined at decision block 603, the client receives a SYN-ACK message from the server before, as determined at decision block 602, the retransmit timer times out, the client determines, at decision block 605, if the SYN-ACK message contains the RDMA option. If the SYN-ACK message does not include the RDMA option, the client sends to the server a TCP/IP ACK message without the RDMA option, at block 607, and starts the data flow over the TCP/IP connection, at block 609. If, as determined at decision block 602, the retransmit timer times out before the client receives the SYN-ACK message from the server, processing returns to block 601, where the client retransmits the SYN message.

If, as determined at decision block 605, the SYN-ACK message does include the RDMA option, the client determines, at decision block 611, if the there is an existing RoCE connection with this server. It will be recalled that a RoCE connection is identified by a RoCE address, which includes the MAC address and GID, and a QP number. If there is an existing RoCE connection with this server, processing proceeds to FIG. 6B, which will be described below. If there is not an existing RoCE connection with this server, the client saves the server's RDMA connection parameters, at block 613. Then, the client allocates a QP and an RMB for the connection, associates its QP with the server's QP, and selects RMB indexing information for the connection, at block 615. The client then sends to the server a TCP/IP ACK message with the RDMA option including its QP number, RMB index, and RMB key, at block 617. The client sets its QP state to ready to receive and starts a confirmation timer, at block 619, and waits to receive an RDMA confirmation over the RoCE connection. The purpose of this confirmation is to verify that it is possible to communicate over the QPs. If the client receives a confirmation from the server, as determined at decision block 623, before the confirmation reply timer times out, at decision block 621, the client sets its QP state to ready to receive, and sends a reply to the server over RoCE, at block 625. Then the data flow for the TCP/IP connection starts over the RoCE connection, at block 627. If the client does not receive a confirmation from the server, as determined at decision block 623, before the confirmation reply timer times out, at decision block 621, the data flow starts over the TCP/IP connection, at block 609.

Referring back to decision block 611, if there is an existing RoCE connection with this server, the client determines, at decision block 629 (FIG. 6B), if the SYN-ACK from the server includes a new RMB; if so, the client saves the server's new RMB index and new RMB key, at block 631. Then, the client determines, as indicated at decision block 633, whether or not to allocate a new RMB. The determination may be based upon whether existing RMB is full or upon some other policy. If the determination is to allocate a new RMB, the client allocates a new RMB and selects RMB indexing information, at block 635, and sends an ACK to the server that includes the RDMA option with the existing QP number, new RMB key, and new RMB indexing information, at block 637. If, at decision block 633, the client determines not to allocate a new RMB, the client selects a new RMB index for the session, at block 639, and sends an ACK to the server that includes the RDMA option with the existing QP number, RMB key, and the new RMB indexing information, at block 641. Then the TCP/IP data flow starts over the RoCE connection, at block 643.

Figure 7A:
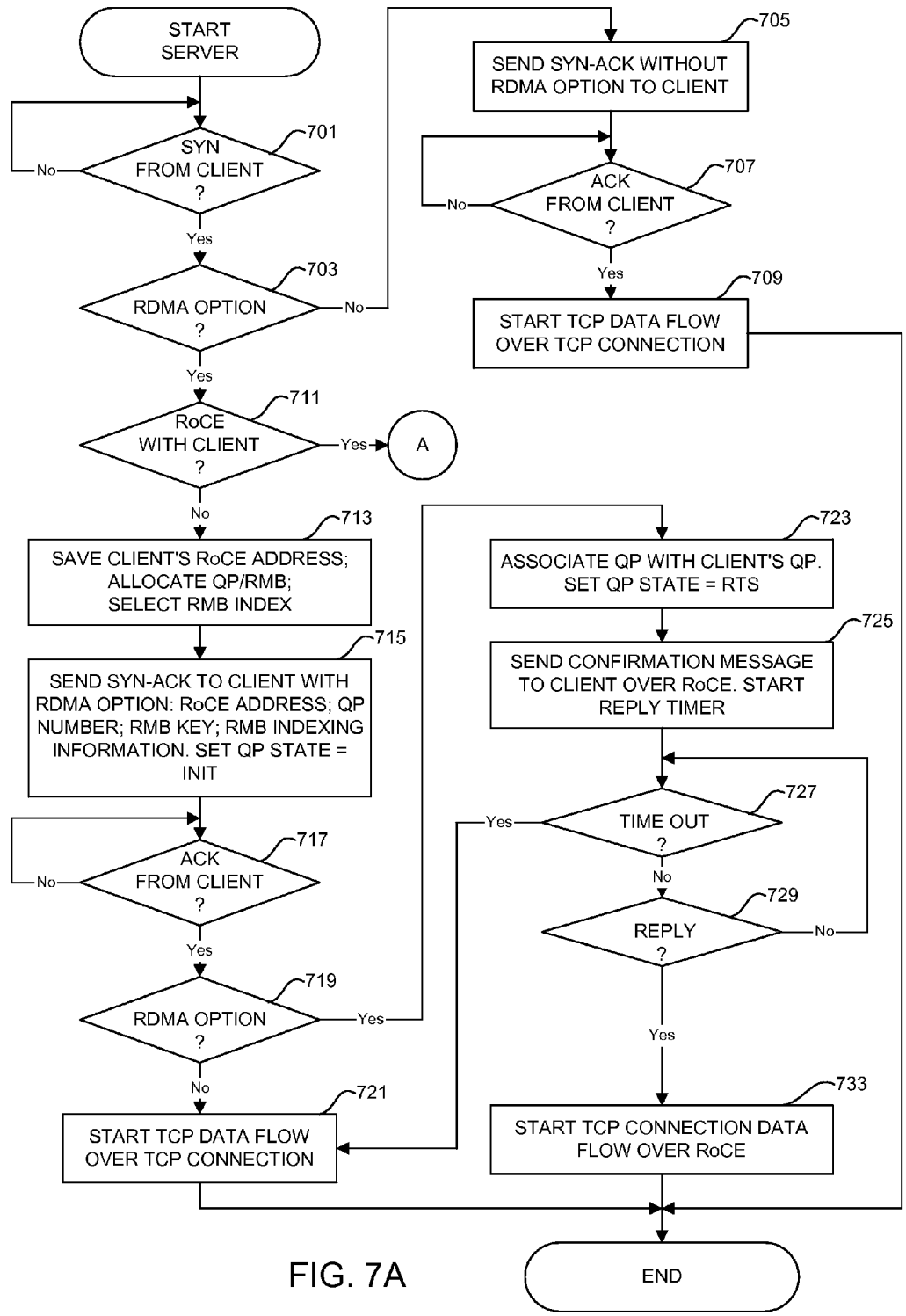
FIGS. 7A and 7B comprise flowchart of an embodiment of server connection setup processing according to the present invention; and, FIG. 8 is a block diagram of a computing device in which features of the present invention may be implemented.
Figure 7B:
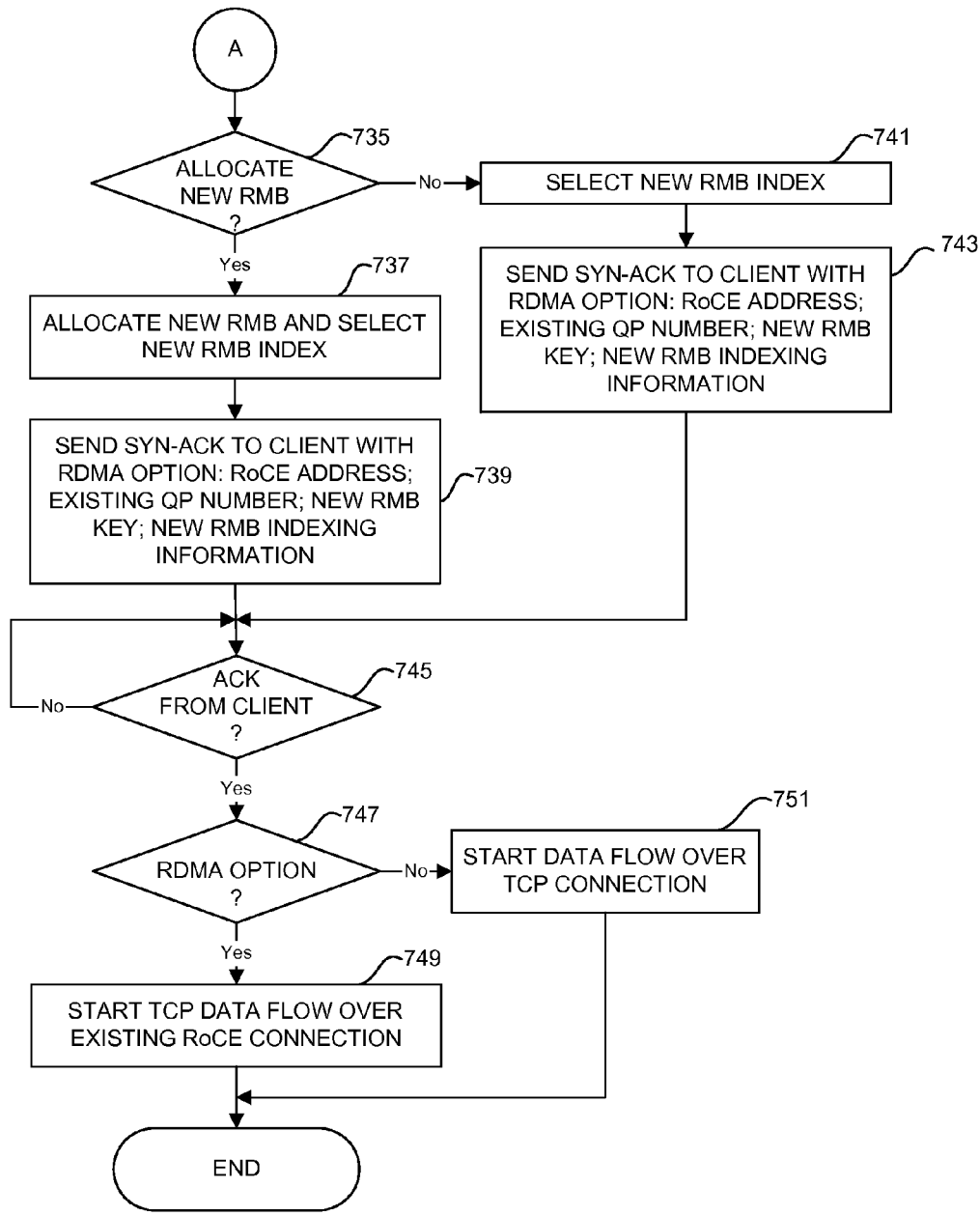

FIGS. 7A and 7B comprise a flowchart of an embodiment of server TCP/IP and RDMA connection setup. The server waits for a TCP/IP SYN message from a client. When, as determined at decision block 701, the server receives a TCP/IP SYN message, the server determines, at decision block 703, if the TCP/IP SYN message includes the RDMA option. If the SYN message does not include the RDMA option, the server sends a TCP/IP SYN-ACK message to the client, without the RDMA option, at block 705, and waits for a TCP/IP ACK message from the client. When, as determined at decision block 707, the server receives an ACK message from the client, the server starts the data flow over the TCP/IP connection, at block 709.

Returning to decision block 703, if the SYN message does include the RDMA option, the server determines, at decision block 711, if it has an existing RoCE connection with this client. If there is an existing RoCE connection with this client, processing proceeds to FIG. 7B, which will be described below. If the server does not have an existing RoCE connection with this client, the server saves the client's RoCE address, allocates a QP and an RMB, and selects RMB indexing information, at block 713. Then, the server sends to the client a TCP/IP SYN-ACK message with the RDMA option including the server's RoCE address, QP number, RMB key, and RMB indexing information, and set its QP state to initialized, at block 715. The server then waits for a TCP/IP ACK message from the client. When, as determined at decision block 717, the server receives the ACK, the server determines, at decision block 719, if the ACK message includes the RDMA option. In some cases either an RDMA aware server or client may opt not to use a RoCE connection and instead use a TCP/IP connection for the data flow. If the ACK message does not include to RDMA option, the server starts the data flow using the TCP/IP connection, at block 721. If, as determined at decision block 719, the ACK message does include the RDMA option, the server associates its QP with the client's QP, and sets its QP state to ready to send, at block 713. Then, the server sends a confirmation message to the client over the RoCE connection and starts a confirmation reply timer, at block 725. If the server receives a confirmation reply from the client, as determined at decision block 729, before the confirmation timer times out, at decision block 727, the server starts the data flow for the TCP/IP connection over the RoCE connection, at block 733. If the server does not receive a confirmation reply from the client, as determined at decision block 729, before the confirmation timer times out, at decision block 727, the data flow starts over the TCP/IP connection, at block 721.

Referring back to decision block 711, if there is an existing RoCE connection with this client, processing proceeds to FIG. 7B. The server determines, at decision block 735, whether or not to allocate a new RMB for the connection. If the server determines to allocate a new RMB, the server allocates a new RMB and selects a new RMB index, at block 737. Then, the server sends a TCP/IP SYN-ACK message to the client with an RDMA option including the server's RoCE address, existing QP number, new RMB key, and new RMB indexing information, at block 739. If, as determined at decision block 735, the server determines not to allocate a new RMB, the server selects a new RMB index, at block 741. Then, the server sends to the client a TCP/IP SYN-ACK message with an RDMA option including the server's RoCE address, existing QP number, RMB key, and new RMB indexing information, at block 743. After sending the TCP/IP SYN-ACK message, at block 739 of block 743, the server waits for a TCP/IP ACK message from the client, at decision block 745. If, as determined at decision block 747, the TCP/IP ACK message includes the RDMA option, the TCP/IP data flow starts over the RoCE connection, at block 749. If the TCP/IP ACK message does not include the RDMA option, the TCP/IP data flow starts over the TCP/IP connection, as indicated at block 751.

Figure 8:
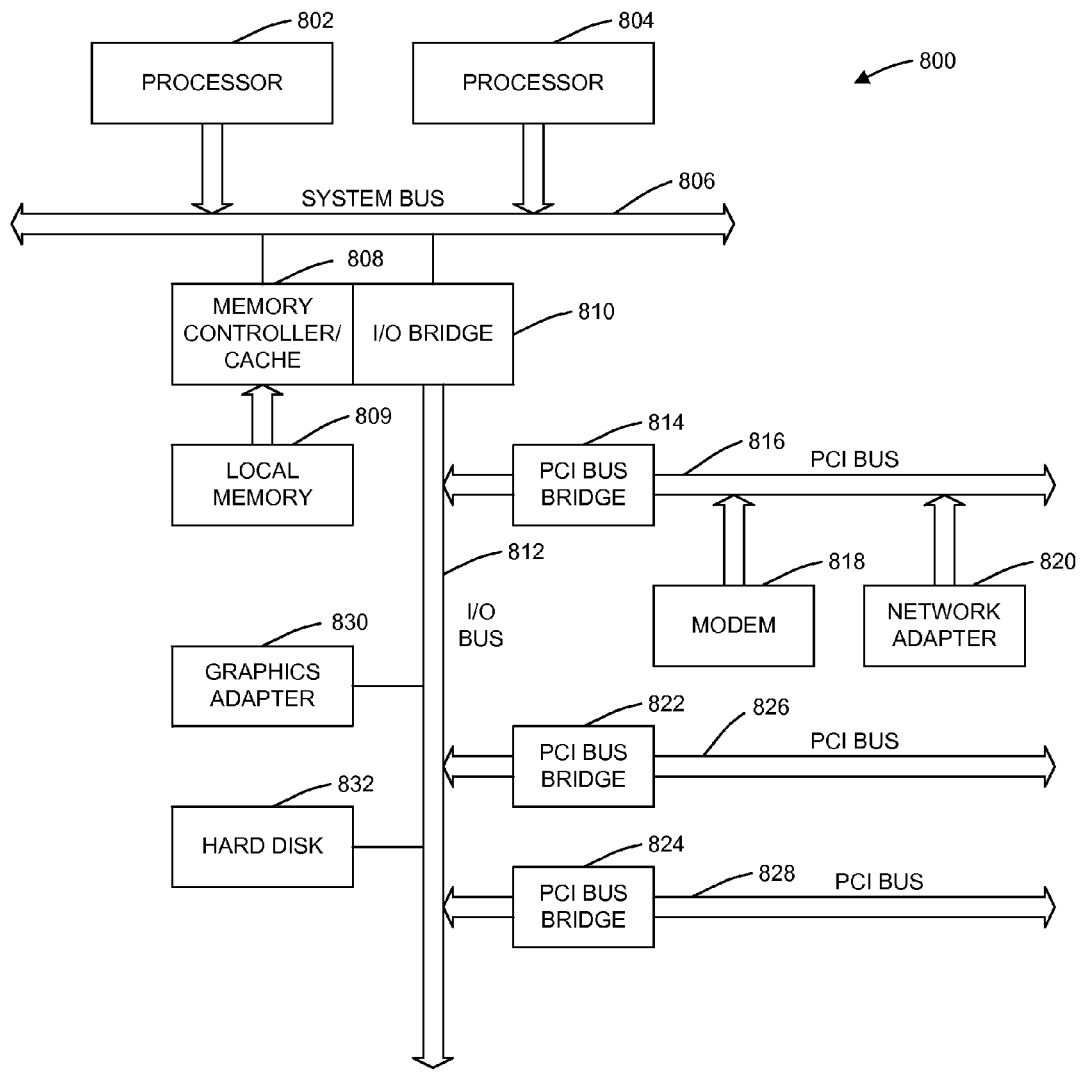

FIG. 8 is a block diagram of a data processing system upon which embodiments of the present invention may be implemented. Data processing system 800 may be a symmetric multiprocessor (SMP) system including a plurality of processors 802 and 804 connected to system bus 806. Alternatively, a single processor system may be employed. Also connected to system bus 806 is memory controller/cache 808, which provides an interface to local memory 809. I/O bus bridge 810 is connected to system bus 806 and provides an interface to I/O bus 812. Memory controller/cache 808 and I/O bus bridge 810 may be integrated as depicted.

Peripheral component interconnect (PCI) bus bridge 814 connected to I/O bus 812 provides an interface to PCI local bus 816. A number of modems may be connected to PCI local bus 816. Typical PCI bus implementations will support four PCI expansion slots or add-in connectors. Communications links to networks may be provided through a modem 818 or a network adapter 820 connected to PCI local bus 816 through add-in boards. Additional PCI bus bridges 822 and 824 provide interfaces for additional PCI local buses 826 and 828, respectively, from which additional modems or network adapters may be supported. In this manner, data processing system 800 allows connections to multiple network computers. A memory-mapped graphics adapter 830 and hard disk 832 may also be connected to I/O bus 812 as depicted, either directly or indirectly.

Those of ordinary skill in the art will appreciate that the hardware depicted in FIG. 8 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 8 may be, for example, an IBM® System z® server, a product of International Business Machines Corporation in Armonk, N.Y., running the z/OS® operating system or LINUX operating system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A system, which comprises:
   a protocol stack configured to establish first technology connection with a second system, said establishment of said first technology connection identifying a second technology connection between said system and said second system, wherein said first technology connection comprises a transport layer connection and said second technology connection comprises a remote direct memory access (RDMA) connection, wherein said protocol stack is configured to exchange RDMA connection identification parameters with said second system during a transport layer setup process between said system and said second system; and,
   code stored in memory that when executed sends data between said system and said second system using said identified second technology connection.

2. The system as claimed in claim 1, wherein said protocol stack is configured to send a Transport Control Protocol/Internet Protocol (TCP/IP) SYN message to said second system, said SYN message including options identifying an RDMA over converged Ethernet (RoCE) address for said system.

3. The system as claimed in claim 2, wherein said protocol stack is configured receive a TCP/IP SYN-ACK message from said second system to said first system, said SYN-ACK message including options identifying a RoCE address, a queue pair (QP) number, a remote memory buffer (RMB) key, and RMB indexing information for said second system.

4. The system as claimed in claim 3, wherein said protocol stack is configured, in response to receiving said SYN-ACK message from said second system, to send a TCP/IP ACK message to said second system, said ACK message including options identifying a QP number, an RMB key, and RMB indexing information for said system.

5. The system as claimed in claim 1, wherein said protocol stack is configured to:
   receive a Transport Control Protocol/Internet Protocol (TCP/IP) SYN message from said first system, said SYN message including options identifying an RDMA over converged Ethernet (RoCE) address for said first system;
   in response to said receiving said SYN message, to send a TCP/IP SYN-ACK message to said first system, said SYN-ACK message including options identifying a RoCE address, a queue pair (QP) number, a remote memory buffer (RMB) key, and RMB indexing information for said second system; and, receive a TCP/IP ACK message from said first system, said ACK message including options identifying a QP number, an RMB key, and RMB indexing information for said first system.

6. The system as claimed in claim 1, wherein said protocol stack is configured to:

send to said second system a Transport Control Protocol/Internet Protocol (TCP/IP) SYN message, said SYN message including options identifying an RDMA over converged Ethernet (RoCE) address for said from system;

receive from said second system in response to said SYN message, a TCP/IP SYN-ACK message, said SYN-ACK message including options identifying a RoCE address, a queue pair (QP) number, a remote memory buffer (RMB) key, and RMB indexing information for said second system; and, in response to receiving said SYN-ACK message, send to said second system a TCP/IP ACK message, said ACK message including options identifying a QP number, an RMB key, and RMB indexing information for said first system.

7. A computer program product in computer readable storage medium, said computer program product comprising:

instructions stored in said computer readable storage medium establishing a first technology connection between a first system and a second system, said establishing including identifying a second technology connection between said first system and said second system, wherein said first technology connection comprises a transport layer connection and said second technology connection comprises a remote direct memory access (RDMA) connection, wherein said instructions stored in said computer readable storage medium for establishing said transport layer connection include instructions stored in said computer readable storage medium for exchanging RDMA connection identification parameters between said first system and said second system during a transport layer setup process between said first system and said second system; and, instructions stored in said computer readable storage medium for sending data between said first system and said second system using said second technology connection identified in said establishing said transport layer connection.

8. The computer program product as claimed in claim 7, wherein said instructions for exchanging remote direct memory access connection parameters include:

instructions stored in said computer readable storage medium for sending a Transport Control Protocol/Internet Protocol (TCP/IP) SYN message from said first system to said second system, said SYN message including options identifying an RDMA over converged Ethernet (RoCE) address for said first system.

9. The computer program product as claimed in claim 8, wherein said instructions for exchanging remote direct memory access connection parameters include:

Instructions stored in said computer readable storage medium for sending a TCP/IP SYN-ACK message from said second system to said first system, said SYN-ACK message including options identifying a RoCE address, a queue pair (QP) number, a remote memory buffer (RMB) key, and RMB indexing information for said second system.

10. The computer program product as claimed in claim 9, wherein said instructions for exchanging remote direct memory access connection parameters include:

instructions stored in said computer readable storage medium for sending a TCP/IP ACK message from said first system to said second system, said ACK message including options identifying a QP number, an RMB key, and RMB indexing information for said first system.

11. The computer program product as claimed in claim 7, wherein said instructions for establishing said transport layer connection between said first system and said second system include:

instructions stored in said computer readable storage medium for receiving at said second system a Transport Control Protocol/Internet Protocol (TCP/IP) SYN message from said first system, said SYN message including options identifying an RDMA over converged Ethernet (RoCE) address for said first system;

instructions stored in said computer readable storage medium for, in response to said receiving said SYN message, sending a TCP/IP SYN-ACK message to said first system, said SYN-ACK message including options identifying a RoCE address, a queue pair (QP) number, a remote memory buffer (RMB) key, and RMB indexing information for said second system; and, instructions stored in said computer readable storage medium for receiving at said second system a TCP/IP ACK message from said first system, said ACK message including options identifying a QP number, an RMB key, and RMB indexing information for said first system.

12. The computer program product as claimed in claim 7, wherein said instructions for establishing said transport layer connection between said first system and said second system include:

instructions stored in said computer readable storage medium for sending from said first system to said second system a Transport Control Protocol/Internet Protocol (TCP/IP) SYN message, said SYN message including options identifying an RDMA over converged Ethernet (RoCE) address for said from system;

instructions stored in said computer readable storage medium for receiving from said second system in response to said SYN message, a TCP/IP SYN-ACK message, said SYN-ACK message including options identifying a RoCE address, a queue pair (QP) number, a remote memory buffer (RMB) key, and RMB indexing information for said second system; and, instructions stored in said computer readable storage medium for, in response to receiving said SYN-ACK message, sending to said second system a TCP/IP ACK message, said ACK message including options identifying a QP number, an RMB key, and RMB indexing information for said first system.

* * * * *